Feb. 9, 1932.  J. J. TOKHEIM  1,844,614
PORTABLE DEVICE FOR REMOVING IMPURITIES FROM STORAGE TANKS
Filed Dec. 30, 1927   2 Sheets-Sheet 1
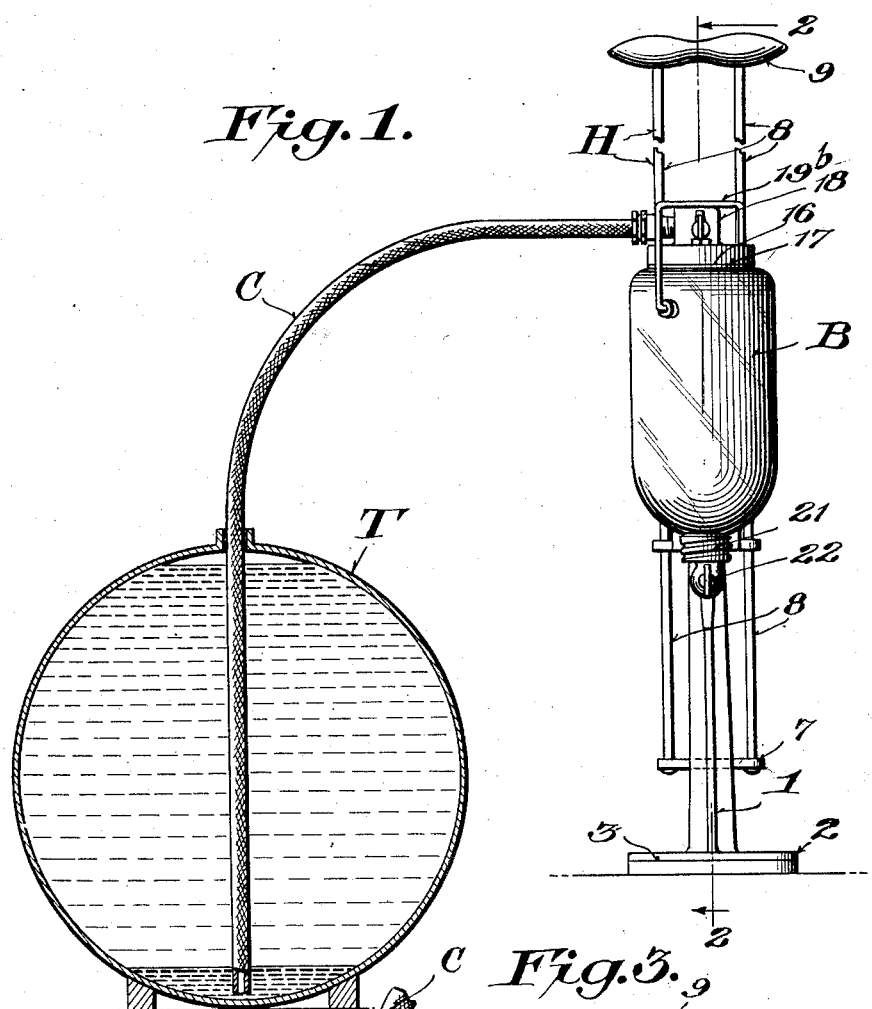
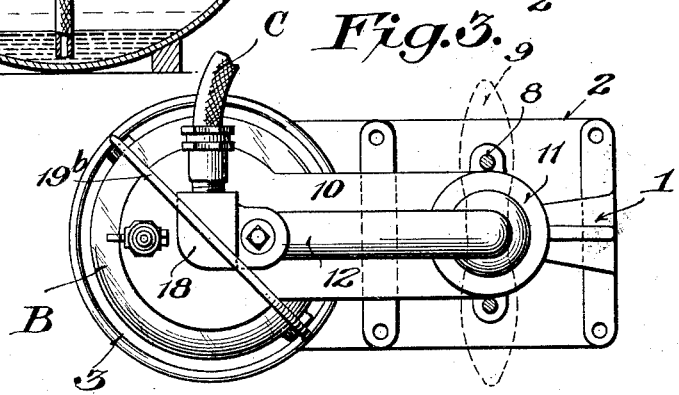
Inventor
J. J. Tokheim,
WITNESSES:-
By
Attorney

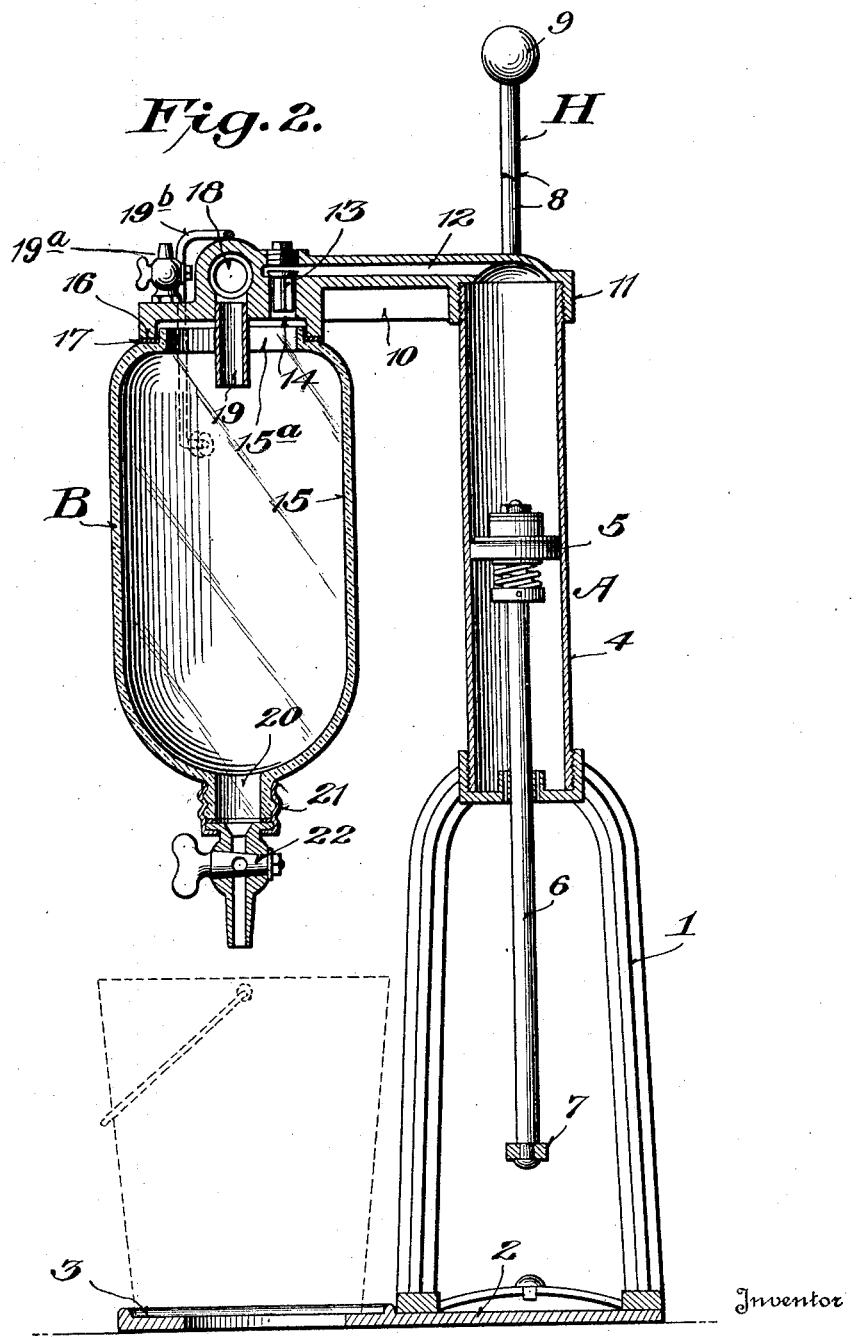

Patented Feb. 9, 1932

1,844,614

UNITED STATES PATENT OFFICE

JOHN J. TOKHEIM, OF CEDAR RAPIDS, IOWA

PORTABLE DEVICE FOR REMOVING IMPURITIES FROM STORAGE TANKS

Application filed December 30, 1927. Serial No. 243,739.

This invention relates to an accessory or device for use in connection with liquid storage tanks and the like, and more particularly to a portable apparatus for removing water and other foreign matter from gasoline tanks or containers.

As gasoline and oil are pumped from a storage tank or container, the air which makes its way into the tank through the vent openings is laden with dust and moisture which condenses into water in the container and settles at the bottom thereof. When insects, such as flies and the like are drawn in with the air they settle on the water line and undergo fermentation which produces a slimy mass that floats on the water. Obviously when the gasoline is pumped from the storage tank, the slimy mass follows the gasoline, and when it is served to customers causes endless carbureter trouble. Heretofore, there has been no device on the market that could readily and conveniently separate and remove water and foreign matter from the gasoline in storage tanks, and, therefore, it is the object of the present invention to provide a construction which may be embodied, in a conveniently portable form, thereby increasing the range of utility of the device and enabling it to service a plurality of tanks of a particular installation.

A further object of the invention is to provide a device possessing novel structural features and characteristics which make the device easy to manufacture and assemble, and also easy to maintain in proper working condition with facility.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 1 is a view illustrating the application of the invention.

Figure 2 is an enlarged detail vertical sectional view thereof.

Figure 3 is a top plan view of the construction shown in Figure 2.

Similar reference characters designate corresponding parts throughout the several figures of the drawings.

Primarily, the invention includes in its organization a vacuum pump device designated generally as A, a suitable liquid trap B, and a pipe or equivalent connection C for connecting the trap B with the tank or container T from which the impurities are to be removed.

The vacuum pump A includes in its organization a suitable base or stand 1 having a bottom plate 2 which is provided with a laterally extending platform 3 for receiving a suitable receptacle to catch the impurities discharged from the trap. The upper end of the stand carries a pump barrel 4 having therein a reciprocating piston 5 whose stem 6 extends exteriorly of the lower end of the barrel and is joined by a cross-head 7 with the rods 8 which connect at their upper ends with the hand grip 9 to provide a pump operating handle.

The upper end of the pump barrel carries a novel combination pump head and trap support designated generally as 10 and including a threaded socket portion 11 for fitting over the upper end of the barrel 4 and having therein a passage-way 12 which communicates with a valve 13 which operates in the vacuum passage-way 14 that leads to the glass or other transparent container 15 which constitutes the trap B. When the pump handle H is manipulated to move the piston 5 downwardly, the valve 13 is unseated to permit the piston to pull or exhaust the air out of the container 15 and thus produce a partial vacuum which becomes more intense, in the well known manner, by continued manipulation of the pump handle. The said head 10 is also provided with an offset flange or collar 16 for receiving the shouldered portion 15$^a$ of the transparent member 15 and also permitting of the use of a rubber or other washer 17 to provide an air-tight connection between the head and the trap. The upper portion of the head in the zone of the trap is formed with an inlet connection 18 which has an interior spout portion 19 for directing the liquid taken inwardly therethrough downwardly into the trap below the passage 14. The said head is also provided with a vent plug 19ª which may be opened to the atmosphere to permit the contents of the trap to drain out, or in other words may function as a siphon breaker. The outside of the inlet connection 18 is connected with the flexible pipe or hose C previously referred to which may be placed in the tank or receptacle T until the lower end thereof is at or close to the bottom of the receptacle. Figure 1 illustrates by heavy dotted lines at the bottom of the tank, an accumulation of water which is to be removed from the gasoline in the upper part of the tank.

Referring further to the trap B which is formed by the transparent container 15 it will be observed that the said container is held to the head 10 by means of a yielding or spring strap or bail 19ᵇ which is carried by the receptacle and engages over the inlet 18 as shown in the drawings thereby to firmly press the receptacle 15 against the seat 17. The lower end of the receptacle 15 is provided with an outlet 20 which is closed by a screw cap 21 and a valve drain plug 22.

From the foregoing it will be seen that the present invention provides a completely self-contained and portable unit that may be readily carried about from place to place and the flexible hose C placed in a container of any desired depth or size. And, while the apparatus is primarily intended for use as a device for cleaning out tanks or containers, nevertheless, it may be conveniently used as a portable device for removing liquids of any kind from barrels or containers so that they can be visibly displayed prior to dispensing. One of the novel and distinctive features of the invention resides in the provision of the combined pump or valve head and trap support which serves the function of carrying the transparent trap and also connecting the trap with the vacuum pump.

Another feature of the invention resides in the ready detachability of the trap from the head, and also the fact that it is transparent to permit the operator to see when the impurities have been completely removed from the tank or storage container.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A portable device of the class described including a stand, a vacuum pump including a barrel mounted on said stand, a combination pump head and trap supporting member fitted to the barrel of said pump, and a transparent receptacle constituting a liquid trap suspended from said pump head, an inlet connection for said trap, a suction connection between the pump and said trap, and a valved drain opening for said trap.

2. In a device of the class described, a trap and a pump barrel, a combination pump head and trap support comprising a body having a pump barrel receiving socket portion and a trap receptacle receiving seat, and also having an interior valved passage-way for establishing communication between the said pump barrel and the trap interior, a liquid inlet connection also communicating with said trap interior, and an atmosphere vent plug carried by the head and adapted to establish communication between the atmosphere and the trap interior.

In testimony whereof I hereunto affix my signature.

JOHN J. TOKHEIM.